United States Patent
Ando (10) Patent No.: US 7,345,795 B2
(45) Date of Patent: Mar. 18, 2008

(54) SYSTEM AND METHOD FOR SCANNING OR READING DOCUMENTS HAVING BOTH COLOR AND MONOCHROMATIC PAGES

(75) Inventor: Koichi Ando, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 1046 days.

(21) Appl. No.: 10/617,022

(22) Filed: Jul. 11, 2003

(65) Prior Publication Data

US 2005/0018267 A1 Jan. 27, 2005

(51) Int. Cl.
*H04N 1/04* (2006.01)
*H04N 1/46* (2006.01)

(52) U.S. Cl. ............... 358/474; 358/496; 358/497; 358/505

(58) Field of Classification Search ............ 358/496, 358/474, 497, 505
See application file for complete search history.

(56) References Cited

U.S. PATENT DOCUMENTS 5,796,928 A * 8/1998 Toyomura et al. ......... 358/1.6
7,130,091 B2 * 10/2006 Ishimaru et al. ........... 358/496

* cited by examiner

*Primary Examiner*—Houshang Safaipour
(74) *Attorney, Agent, or Firm*—Foley & Lardner LLP (57) ABSTRACT

A system and method for scanning a document having a plurality of pages includes scanning a first page in the document at a first scanning speed, the first scanning speed being one of a color speed and a monochromatic speed, and determining if the first page is color or monochrome based on a result of the scan of the first page. If the first speed is the monochromatic speed and the first page is determined to be color, or if the first speed is the color speed and the first page is determined to be monochrome, then the first page is rescanned at a second scanning speed, the second scanning speed being the other of a color speed and a monochromatic speed.

19 Claims, 6 Drawing Sheets

SYSTEM AND METHOD FOR SCANNING OR READING DOCUMENTS HAVING BOTH COLOR AND MONOCHROMATIC PAGES

FIELD OF THE INVENTION

The present invention relates generally to image processing and, more particularly, to a system and method for scanning or reading documents having both color and monochromatic pages.

BACKGROUND OF THE INVENTION

A conventional image reading apparatus typically has three image sensors, red (R), green (G), and blue (B), but does not have an image sensor dedicated to monochromatic images. To process monochromatic images, a monochromatic luminance signal (Y) is generated using the signals from the RGB image sensors. Generating monochromatic images in this manner results in poorer image quality due to a variety of factors, including positional differences between the three image sensors and differences between their spectral sensitivity characteristics.

More particularly, when the monochromatic luminance signal Y is generated directly from the outputs of the RGB image sensors, this can cause an inferior image quality, in part, because of differences between the original reading positions of the image sensors with respect to a pixel from which an image is being generated. Further, a CCD line sensor is typically used as a color CCD in an image reading apparatus. Its image sensors are arranged in lines with finite intervals between them, which can cause a significant decline in image quality when the monochromatic luminance signal Y is generated directly from the outputs of the image sensors without compensating for the reading position differences between the lines. Accordingly, although commonly used, CCD line sensors provide insufficient image quality for generating monochromatic images.

Furthermore, conventional image sensors have attached filters to make the image sensor highly sensitive to a specific wavelength. Such filters, however, reduce the quantity of light supplied to the image sensors. As a result, with an increased reading or scanning rate, the quantity of light supplied to each image sensor is reduced, which degrades the reading accuracy.

Although most conventional image reading devices use a color CCD with a 3-line CCD sensor corresponding to red, green, and blue, it is also possible to have a 4-line CCD sensor with a 1-line monochromatic sensor (black and white) in addition to the red, green, and blue sensors. The 1-line monochromatic sensor of the 4-line CCD sensor improves the resolution and quality of a monochromatic image by avoiding the problems of the 3-line CCD sensor, which uses a method of processing signals from two or more lines to generate monochromatic signals as explained above.

In typical 4-line CCD sensors, however, the color 1-line read frequency is one half that of the monochromatic 1-line read frequency. This difference results from the color filter coupled to each color sensor, each having one half the sensitivity as that of the monochromatic sensor.

Typically, the 4-line CCD sensor divides the 1-line input signal processing of black and white into an odd number and an even number and shares the blue process circuit when processing monochromatic signals. This sharing means that the color sensors and the monochromatic sensor cannot read signals at the same time. As a result, before reading (i.e., scanning) a document, a user must set the image reading apparatus to either a color reading setting or a monochromatic reading setting. Alternatively, a pre-scan can be performed to discriminate between a color document and a monochromatic document.

When documents have both color and monochromatic pages, several problems arise. If a color reading setting is selected, any monochromatic pages of the document suffer from the same problems that arise when using the 3-line CCD sensor, as described above, because the color sensors are used to reproduce the monochromatic image. The pre-scan approach has the drawback that valuable user time is required to perform the pre-scan.

It would be desirable for an image reading apparatus to be able to read monochromatic images rapidly and with desirable image quality, while also obtaining high quality color images.

SUMMARY OF THE INVENTION

Briefly, in one aspect of the invention, a method for scanning a document having a plurality of pages includes scanning a first page in the document at a first scanning speed, the first scanning speed being one of a color speed and a monochromatic speed, and determining if the first page is color or monochrome based on a result of the scan of the first page. If the first speed is the monochromatic speed and the first page is determined to be color, or if the first speed is the color speed and the first page is determined to be monochrome, then the first page is rescanned at a second scanning speed, the second scanning speed being the other of a color speed and a monochromatic speed.

Further features, aspects and advantages of the present invention will become apparent from the detailed description of preferred embodiments that follows, when considered together with the accompanying figures of drawing.

DETAILED DESCRIPTION OF PREFERRED EMBODIMENTS OF THE INVENTIONS

Figure 1:
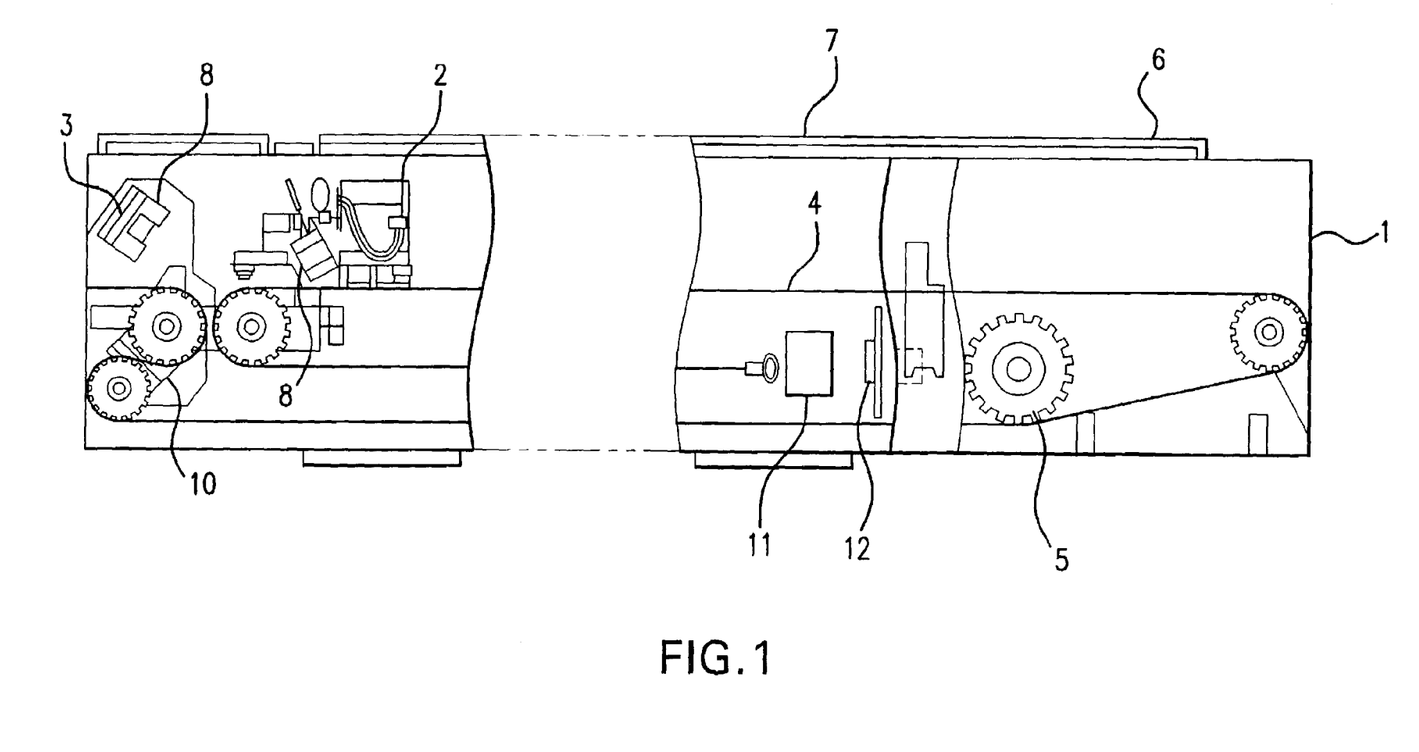
FIG. 1 is a block diagram of an image reading apparatus according to an embodiment of the present invention.

FIG. 1 is a cross sectional view of an image reading apparatus consistent with the present invention. As shown in FIG. 1, the image reading apparatus includes a scanner unit 1 having a carriage 2 and a carriage 3. A wire 4, which is coupled to the carriage 2 and the carriage 3, is led respectively on the front side and rear side of the scanner unit 1.

A motor (not shown) rotates a drive pulley 5 via a belt. When a document 7 is placed on a document glass 6, the drive pulley 5 rotation is transmitted to the carriage 2 and the carriage 3 via the wire 4, thereby allowing scanning of the document 7 from its front end (left) to its rear end (right) by a light source (not shown). The light source may be a lamp or other light generating element and can be located on one of the carriages, such as carriage 2. The speed at which the light source scans the document can be controlled by a control circuit, not shown. The scanned image is reflected by a mirror 8 on carriage 2 and by a mirror 9 and a mirror 10 on carriage 3, focused on a CCD sensor 12 by a lens 11, and converted to electrical signals representing image data for the scanned document 7. The image data typically includes RGB data.

Figure 2:
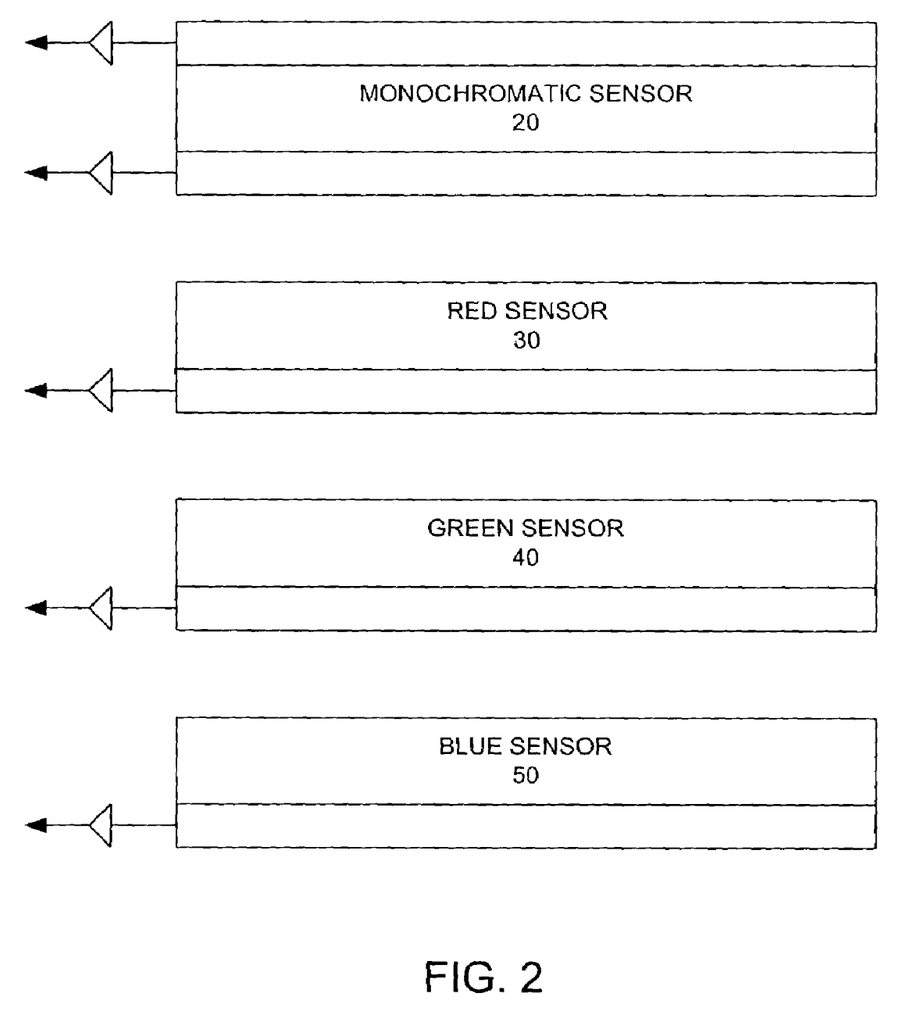
FIG. 2 is a block diagram of a 4-line CCD sensor.

FIG. 2 is a block diagram of a 4-line CCD sensor. As shown in FIG. 2, the 4-line CCD sensor includes a red sensor 30, a green sensor 40, and a blue sensor 50. The 4-line CCD sensor further includes a monochromatic (black and white) sensor 20, which is independent from the color sensors 30, 40, 50. The monochromatic sensor 20 has twice the processing capacity of the color sensors 30, 40, 50.

Each of the three color sensors 30, 40, 50 has a built-in color filter, which reduces the sensitivity of the three color sensors 30, 40, 50 to half the sensitivity of the monochromatic sensor 20. With this reduced sensitivity, the 1-line read frequency of the color sensors 30, 40, 50 is one half that of the monochromatic sensor 20.

When scanning a document page at a speed to produce a resolution of 600 DPI, the color sensors 30, 40, 50 can only read the scanned image at one half of the speed of the monochromatic sensor 20. As a result, the resolution of the image signals output from the color sensors 30, 40, 50, when reading at the same speed as the monochromatic sensor 20, is in fact only 300 DPI (in the sub-scanning direction). To achieve a resolution of 600 DPI from the color sensors 30, 40, 50, the document scanning speed is lowered, e.g., one half of the scanning speed for generating the 600 DPI monochromatic resolution. The different resolutions for the color and monochromatic sensors, when reading scanned images at the same speed, may have an impact when reading a document having both monochromatic and color pages.

Figure 3:
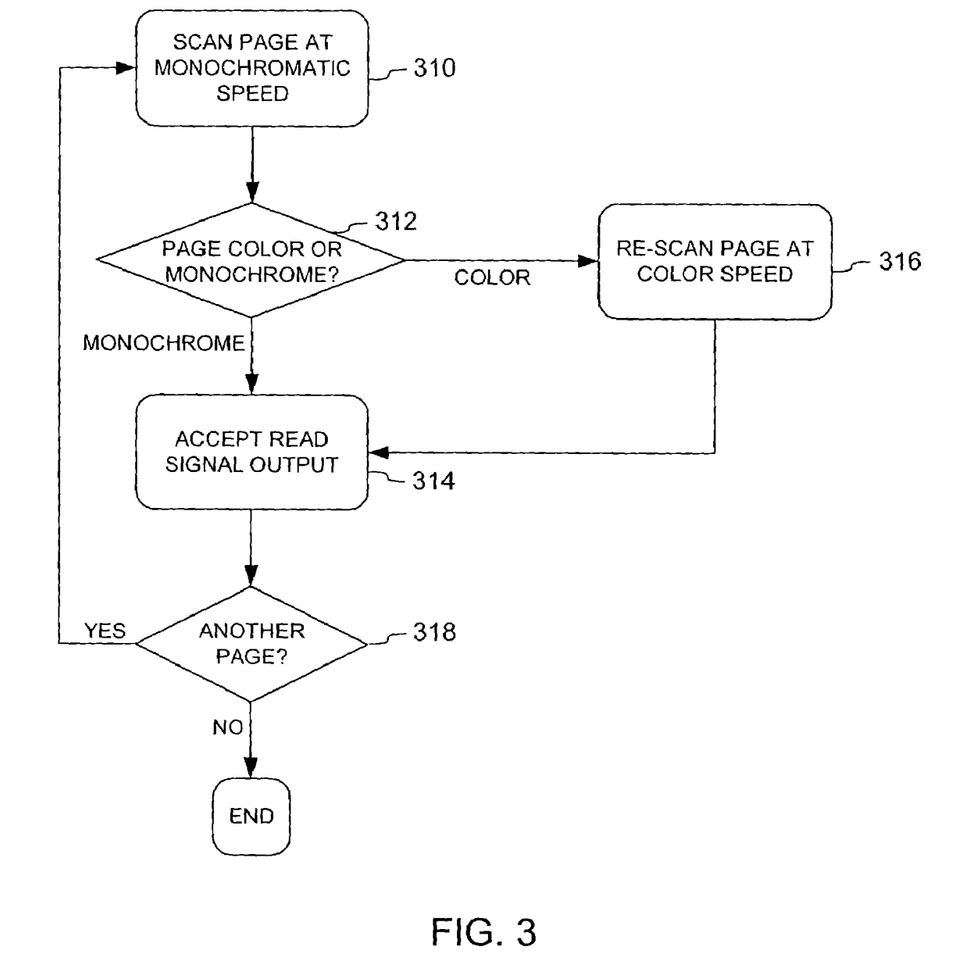
FIG. 3 is a flow diagram of an image reading process consistent with an embodiment of the present invention.

FIG. 3 is a flow diagram of an image reading process consistent with an embodiment of the present invention, such as carried by a CPU or the other known computing unit. As shown in FIG. 3, a document page is first scanned at a monochromatic speed (step 310). The document being scanned may have one or more pages and each page can have monochrome or color components, or both. In general, a page having both color and monochromatic components can be considered a color page. The monochromatic speed is the scanning speed used to obtain a desired resolution for monochromatic image data, such as 600 DPI. A scanning unit preferably scans the page, such as scanner unit 1 shown in FIG. 1. In addition, the CCD sensor 12 for detecting the scanned page is preferably a 4-line CCD sensor, such as that shown in FIG. 2 and described above. The speed at which the light source scans the page can be controlled by a control unit.

After scanning the page, the process determines whether the scanned page is color or monochrome (step 312). This determination may be made by analyzing the RGB values output from the CCD sensor. If the RGB values are all equal, then the page is determined to be monochrome. On the other hand, if the RGB values are not equal, then the page is determined to be color. Other ways exist for making the determination of whether the scanned page is color or monochrome. For example, the RGB values can be compared with a predetermined threshold, and a color page is determined if one of the RGB values differs greatly from a threshold.

If the scanned page is determined to be monochrome, then the signal output from the CCD sensor is accepted (step 314). Since the scanned page is determined to be monochrome, it is possible for only the monochromatic signal to be accepted and the RGB signals to be ignored. Acceptance of the signal output from the CCD sensor, which corresponds to the image data of the scanned page, allows it to be used for a variety of purposes or uses. It can be used to reproduce the scanned page, such as in a copier or in a multi-function peripheral (MFP) having a copy function. The image data can also be stored in a file for future use. The file itself can be stored in a document management system or other storage system that enables a user to access the file. It is also possible to transmit the image data to another device, such as by facsimile. An MFP can incorporate both the document management system and facsimile capabilities. If the signal output from the CCD sensor is not accepted (i.e., rejected), then the signal (image data) is simply deleted or overwritten, such as from a buffer or page memory. A control circuit can be configured to make the determination of whether or not to accept or reject the image data output by the CCD sensor.

If the scanned page is determined to be color, then the page is re-scanned at a color speed (step 316). The color speed is the scanning speed used for obtaining a desired resolution for color image data, such as 600 DPI. The color speed can also be determined as the scanning speed for producing color image data at the same resolution as the monochromatic data generated at the monochromatic speed. The color speed may be a defined rate relative to the monochromatic speed.

As described above with respect to FIG. 2, with using a 4-line CCD sensor having a monochromatic sensor and three color sensors, the color sensors generate image data at a lower resolution than the monochromatic sensor assuming equal scanning speeds for both types of sensors. To achieve the same resolution as the monochromatic image data, the page is scanned at a slower speed for color than for monochrome. The difference in speed between the color speed and monochromatic speed depends on the difference in resolution produced by the color sensors and the monochromatic sensor. For example, if the resolution is 600 DPI for the monochromatic sensor and 300 DPI for the color sensors when scanning at the monochromatic speed, then the scanning speed for color would be one half of the scanning speed for monochrome to produce the same 600 DPI resolution.

Upon completion of the re-scan at the color speed, the image data from the CCD sensor is accepted (step 314). Since the re-scanned page is color, it is possible for only the RGB signals to be accepted and the monochromatic signal to be ignored. After accepting image data for the scanned page, it is then determined if the document has any more pages to scan (step 318). If so, then the new page is scanned and the image data is accepted in accordance with steps 310-316, as described above. If no pages remain, then the process ends.

Using the process of FIG. 3, it is possible to scan a document having color and monochromatic pages and obtain image data for both types of pages at the same resolution. In this process, each page is initially scanned at the monochromatic speed, regardless of whether the page is monochrome or color. If the page turns out to be color, it is re-scanned at the color speed. It is also possible to alter this process so that each page is initially scanned at the color speed, and only re-scanned at the monochromatic speed if the page turns out be monochrome.

Figure 4:
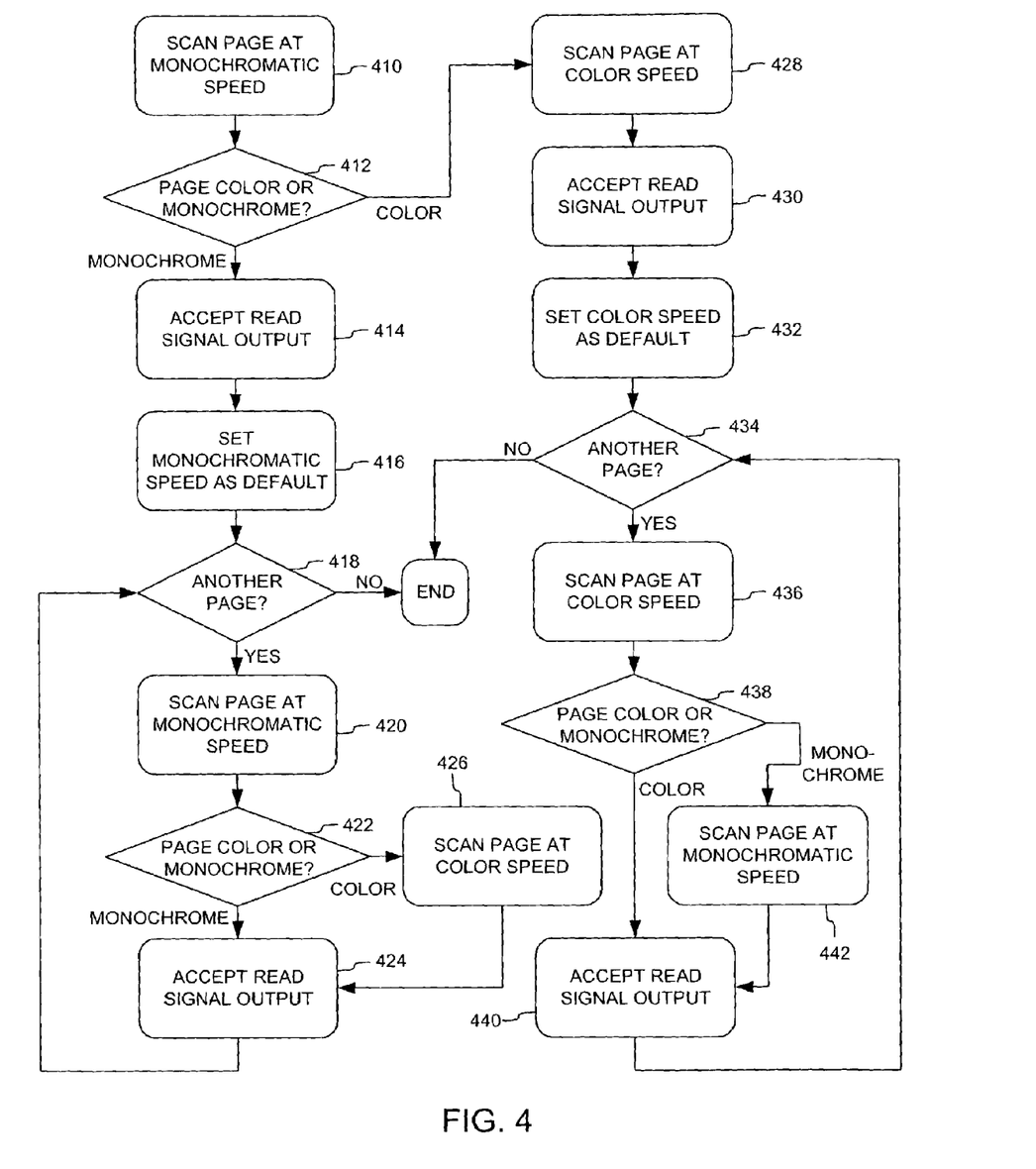
FIG. 4 is a flow diagram of an image reading process consistent with a second embodiment of the present invention.

FIG. 4 is a flow diagram illustrating a second embodiment of an image reading process consistent with the present invention. Like the process of FIG. 3, a first page of a document is initially scanned at a monochromatic speed (step 410), and based on a result of the scan, it is determined if the scanned page is color or monochrome (step 412). If the scanned page is monochrome, then the image data output from the CCD sensor is accepted (step 414). As described above, since the scanned page is determined to be monochrome, it is possible for only the monochromatic signal to be accepted and the RGB signals to be ignored. The monochromatic speed is then set as the default speed (step 416). The default speed is the scanning speed used when each initially scanning each new page of the document. In this example, the monochromatic speed is the predetermined default speed for the process of FIG. 3. As described above, however, the color speed may be the predetermined default speed for the process of FIG. 3.

After setting the monochromatic speed as the default speed, the process determines if the document contains any addition pages (step 418). If not, the process ends. If more pages exist, the next page is scanned at the default speed, which has been chosen as the monochromatic speed (step 420). Like the first page, the process determines whether the currently scanned page is color or monochrome (step 422). If it is monochrome, then the image data output from the CCD sensor is accepted (step 424) (where only the monochrome signal may be accepted). If the currently scanned page is color, it is re-scanned, this time at the color speed (step 426), and the image data output from the CCD sensor after the re-scan is accepted (step 424). As described above, since the re-scanned page is determined to be color, it is possible for only the RGB signals to be accepted and the monochromatic signal to be ignored. Steps 420 to 426 of FIG. 4 essentially correspond to steps 310 to 316 of FIG. 3. Steps 420 to 426 are repeated for each additional page of the document.

Returning to step 412, if the first page of the document is determined to be color, then the first page is re-scanned, this time at the color speed (step 428). The image data output from the CCD sensor after the re-scan is accepted (step 430) (where only the color signals may be accepted). Since the first page had been identified as color, the color speed is set as the default scanning speed (step 432).

The process then determines whether the document contains any more pages (step 434). If not, then the process ends. If there are more pages, the next page is scanned at the default speed, which is the color speed (step 436). Like the first page, the process determines whether the currently scanned page is color or monochrome (step 438). If it is color, then the image data output from the CCD sensor is accepted (step 440) (where only the color signals may be accepted). If the currently scanned page is monochrome, it is re-scanned, but at the monochromatic speed (step 442), and the image data output from the CCD sensor after the re-scan is accepted (step 440). Steps 436 to 442 of FIG. 4 essentially correspond to steps 420 to 426 of FIG. 4, but with color and monochrome reversed because of the different default scanning speeds. Steps 436 to 442 are repeated for each additional page of the document.

The process of FIG. 4 determines a default scanning speed according to the first page of the document, whereas the FIG. 3 process predetermines the default scanning speed. The process of FIG. 4 enhances efficiency when the first page of a document is representative of the types of pages in the document. For example, if the first page is color, then the color speed is set as the default scanning speed, and each subsequent page is initially scanned at the color speed. If most or all subsequent pages are in fact color, then re-scanning is minimized as few or no other pages of the document are monochrome. Like the process of FIG. 3, the scanning of the first page in the process of FIG. 4 can be at the color speed instead of at the monochromatic speed.

Figure 5:
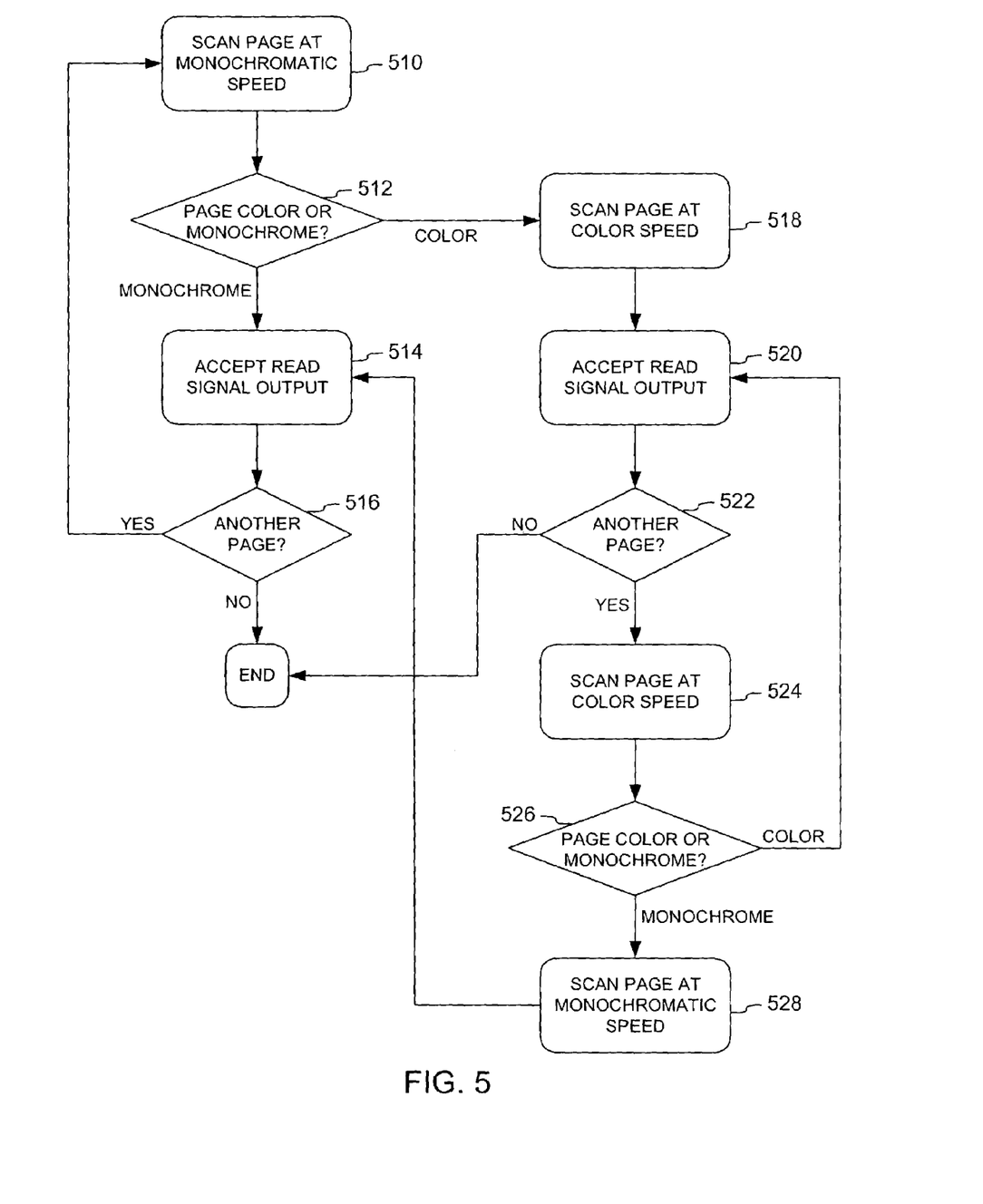
FIG. 5 is a flow diagram of an image reading process consistent with a third embodiment of the present invention.

FIG. 5 is a flow diagram illustrates a third embodiment of an image reading process consistent with the present invention. As shown in FIG. 5, a first page of a document is scanned at the monochromatic speed (step 510). Based on a result of the scan, it is determined if the scanned page is color or monochrome (step 512). If the scanned page is monochrome, then the image data output from the CCD sensor is accepted (step 514). As described above, since the scanned page is determined to be monochrome, it is possible for only the monochromatic signal to be accepted and the RGB signals to be ignored. After accepting the image data, the process determines whether the document has any more pages (step 516). If not, the process ends. If there are more pages, then the next page is scanned at the monochromatic speed, in accordance with step 510.

Returning to step 512, if the first page of the document is determined to be color, then the first page is re-scanned, but at the color speed (step 518). The image data output from the CCD sensor after the re-scan is accepted (step 520). As described above, since the scanned page is determined to be color, it is possible for only the RGB signals to be accepted and the monochromatic signal to be ignored. The process determines whether the document has any more pages (step 522). If not, then the process ends. If there are more pages, the next page is scanned at the color speed (step 524). Analogous to the first page, the process determines whether the currently scanned page is color or monochrome (step 526). If it is color, then the image data output from the CCD sensor is accepted (step 520), and if there is another page, it is also scanned initially at the color speed, in accordance with steps 522 and 524.

If the currently scanned page at step 526 is monochrome, it is re-scanned, but at the monochromatic speed (step 528), and the image data output from the CCD sensor after the re-scan is accepted, in accordance with step 514. If there is another page, it is scanned initially at the monochromatic speed, in accordance with steps 516 and 510.

The process of FIG. 5 is analogous to the process of FIG. 4 in that it effectively sets a default scanning speed. The difference between the two approaches is that, the FIG. 5 process sets the default scanning speed according to the most recent page scanned in the document, and not solely on the first page scanned, as in the FIG. 4 process. For example, in the FIG. 5 process, when a first page is color, then the next page is initially scanned at the color speed. As long as the subsequent pages are also color, each subsequent page will be first scanned at the color speed. If a subsequent page is monochrome, however, then after re-scanning that page at the monochromatic speed, the next page is first scanned at the monochromatic speed. The process of FIG. 5 is useful where a document has several groupings of like-type pages, i.e., one or more groups of monochrome pages and one or more groups of color pages, where each group has pages of the same type. Also, as in the processes of FIGS. 3 and 4, the FIG. 5 process can involve scanning the first page at a color speed instead of the monochrome speed.

In the processes of FIGS. 3 to 5, if the scanning speed does not correspond to or match the page type, such as scanning a color page at the monochromatic speed, then the page is re-scanned at the other scanning speed. Due to this re-scanning, with numerous mismatches between scanning speed and page type, the time to scan the entire document may increase significantly.

Figure 6:
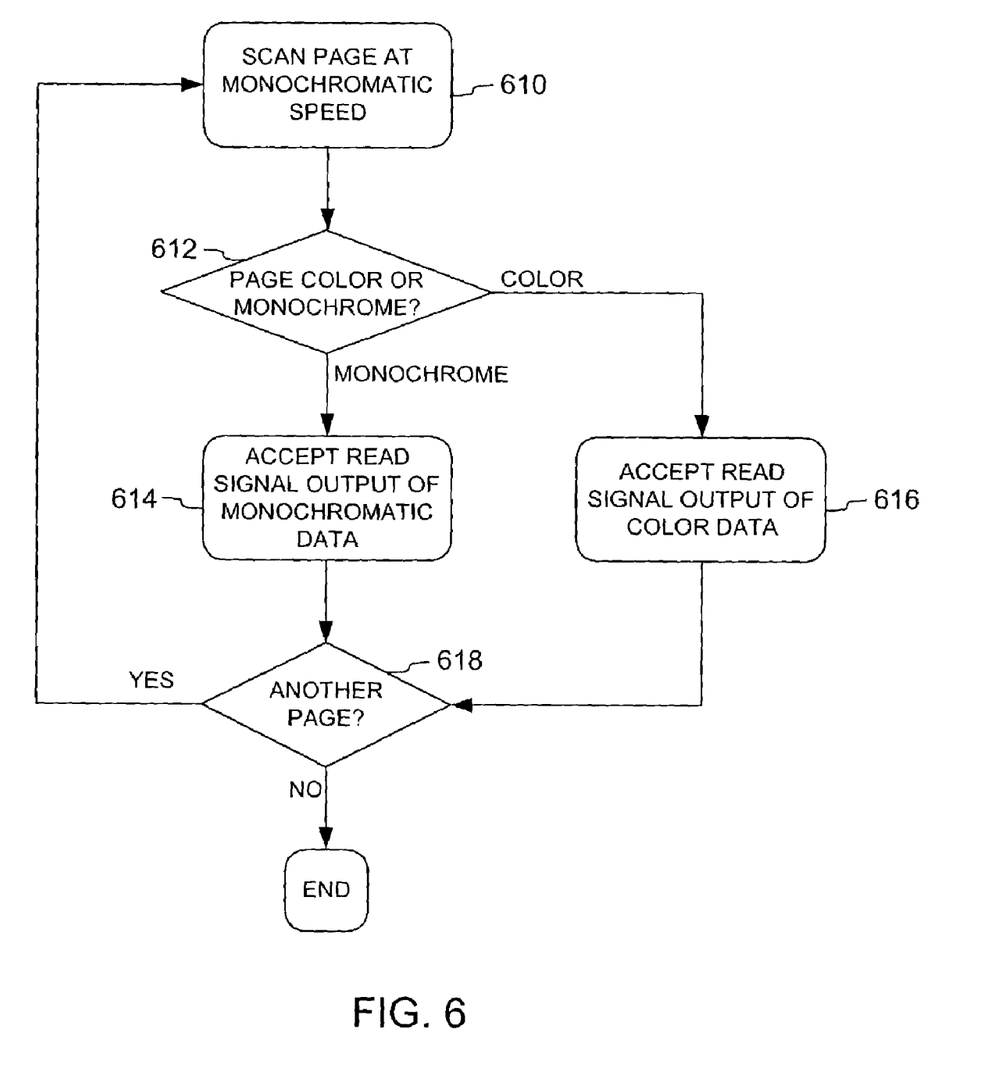
FIG. 6 is a flow diagram of an image reading process consistent with a fourth embodiment of the present invention.

FIG. 6 is a flow diagram illustrating a fourth embodiment of an image reading process consistent with the present invention. In the FIG. 6 process, the first page is scanned at the monochromatic speed (step 610). Based on a result of the scan, it is determined if the scanned page is color or monochrome (step 612). If the scanned page is monochrome, then the image data output from the monochromatic sensor is accepted (step 614). The image data from the monochromatic sensor is only the black and white data. Also, since the page is scanned at the monochromatic speed, the image data from the monochromatic sensor is at the desired resolution, such as 600 DPI.

If the scanned page is color, then the image data output from the color sensors, such as red, green and blue sensors, is accepted (step 616). Since the page is scanned at the monochromatic speed, the image data from the color sensors is at a lower resolution than the image data output from the monochromatic sensor, such as 300 DPI as compared to 600 DPI. The process then determines whether the document contains any additional pages (step 618). If not, then the process ends. If there are additional pages, then the process according to steps 610 to 616 is repeated for those pages.

The process of FIG. 6, in general, is capable of scanning a document faster than the processes of FIGS. 3 to 5 because no re-scanning is performed. However, with the process of FIG. 6, the resolution for the color image data is lower than that for the processes of FIGS. 3 to 5.

It is possible, when using any of the processes of FIGS. 3 to 6 for scanning documents having both color and monochromatic pages, to avoid the use of pre-scans, which shortens the reading (scanning) time for the document. In addition, each of the processes enable scanned monochromatic pages to be read by a monochromatic sensor, which avoids the problems arising from the use of conventional 3-line CCD sensors, such as space time correction, color aberration and bleeding of colors. Furthermore, different embodiments can be chosen when stressing different considerations. The FIG. 6 process achieves the fastest reading speed of documents having color and monochromatic pages, since no re-scanning is done. Although the color resolution in the sub-scanning direction diminishes, the reading speed of each document page is at the monochrome reading speed, which provides for a high-speed reading ability.

The processes of FIGS. 3 to 6 can be selected by the user before scanning the document. The user can also select the initial scanning speed for the processes of FIGS. 3 to 5 as either the monochromatic speed or the color speed. Before selecting which process to use, the user can examine the document being scanned and identify the process best suited for that document.

In addition, the scanning process can involve counting the number of color pages and monochromatic pages as they are being scanned, and setting the initial scanning speed for the subsequent page based on the majority type of the pages of the document scanned to that point. Other approaches for setting the default scanning speed can be used as well, such as the majority scanning speed of the last three (or more) pages, etc.

The foregoing description of a preferred embodiment of the invention has been presented for purposes of illustration and description. It is not intended to be exhaustive or to limit the invention to the precise form disclosed, and modifications and variations are possible in light in the above teachings or may be acquired from practice of the invention. The embodiments were chosen and described in order to explain the principles of the invention and as practical application to enable one skilled in the art to utilize the invention in various other embodiments and with various modifications are suited to the particular use contemplated. It is intended that the scope of the invention be defined by the claims appended hereto and their equivalents.

What is claimed is:

1. A method for scanning a document comprising a plurality of pages, comprising:
    scanning a first page in the document at a first scanning speed, the first scanning speed being one of a color speed and a monochromatic speed;
    determining if the first page is color or monochrome based on a result of the scan of the first page;
    rescanning the first page at a second scanning speed, the second scanning speed being the other of a color speed and a monochromatic speed, if the first speed is the monochromatic speed and the first page is determined to be color, or if the first speed is the color speed and the first page is determined to be monochrome; and
    maintaining a count of the number of scanned pages that are color and the number of scanned pages that are monochrome, and at each subsequent page of the document to be scanned, initially scanning that subsequent page at the monochrome scanning speed or the color scanning speed when the majority of the scanned pages are monochrome or color, respectively.

2. A method according to claim 1, further comprising:
    scanning a second page in the document at the first scanning speed;
    determining if the second page is color or monochrome based on a result of the scan of the second page; and
    rescanning the second page at the second scanning speed if the first speed is the monochromatic speed and the second page is determined to be color, or if the first speed is the color speed and the second page is determined to be monochrome.

3. The method according to claim 2, wherein the first scanning speed is the monochromatic speed and the second scanning speed is the color speed.

4. A method according to claim 1, further comprising
    scanning a second page in the document at the first scanning speed if the first page is not rescanned; and
    scanning the second page at the second scanning speed if the first page is rescanned.

5. A method according to claim 4, further comprising:
    determining if the second page is color or monochrome based on a result of the scan of the second page; and
    rescanning the second page if the scanning speed for the second page is the monochromatic speed and the second page is determined to be color, or if the scanning speed for the second page is the color speed and the second page is determined to be monochrome.

6. A method according to claim 4, further comprising:
for each subsequent page of the document, scanning that subsequent page at the same scanning speed as the last scanning speed of the preceding page of the document.

7. A method according to claim 1, further comprising:
initially scanning each subsequent page of the document at the first scanning speed if the first page is not rescanned; and
initially scanning each subsequent page of the document at the second scanning speed if the first page is rescanned.

8. A method according to claim 7, wherein, for each subsequent page, that subsequent page is rescanned if the initial scanning speed for that subsequent page is the monochromatic speed and that subsequent page is determined to be color or if the initial scanning speed for that subsequent page is the color speed and that subsequent page is determined to be monochrome.

9. A method according to claim 1, wherein the monochromatic speed is faster than the color speed.

10. A method according to claim 1, further comprising:
detecting the scanned first page with a 4-line CCD sensor; and
generating a read signal from the detection of the scanned first page.

11. A method for scanning a document comprising a plurality of pages, comprising:
scanning a first page in the document at a one of a color speed and a monochromatic speed; detecting the scanned first page with a 4-line CCD sensor having a monochromatic sensor, a red sensor, a green sensor and a blue sensor; and
generating read signals from each of the sensors of the 4-line CCD sensor;
determining if the first page is color or monochrome based on a result of the scanning;
accepting only the read signal of the monochromatic sensor if the first page is determined to be monochrome; and
accepting only the read signals of two or more of the red sensor, the green sensor and the blue sensor if the first page is determined to be color;
scanning second through nth pages with the 4-line CCD sensor, n being an integer greater than two; and
maintaining a count of the number of scanned pages that are color and the number of scanned pages that are monochrome, and at each subsequent page of the document to be scanned, initially scanning that subsequent page at the monochrome scanning speed or the color scanning speed when the majority of the scanned pages are monochrome or color, respectively.

12. A method according to claim 11, wherein a resolution of image data output from the monochromatic sensor is higher than a resolution of image data output from the red sensor, the green sensor and the blue sensor.

13. A system for scanning a document comprising a plurality of pages, the system comprising:
a light source that scans light a first page in the document at a first scanning speed, the first scanning speed being one of a color speed and a monochromatic speed;
one or more mirrors that reflect the light scanned on the first page;
a sensor that detects the light reflected by the one or more mirrors and generates image data of the first page from the detected light;
a detection circuit configured to determine if the first page is color or monochrome based on the image data of the first page; and
maintaining a count of the number of scanned pages that are color and the number of scanned pages that are monochrome, and at each subsequent page of the document to be scanned, initially scanning that subsequent page at the monochrome scanning speed or the color scanning speed when the majority of the scanned pages are monochrome or color, respectively,
wherein the light source rescans the first page at a second scanning speed, the second scanning speed being the other of a color speed and a monochromatic speed, if the first speed is the monochromatic speed and the first page is determined to be color by the detection circuit, or if the first speed is the color speed and the first page is determined to be monochrome by the detection circuit.

14. A system according to claim 13, wherein the light source scans a second page in the document at the first scanning speed, the detection circuit being further configured to determine if the second page is color or monochrome based on a result of the scan of the second page, and
wherein the light source rescans the second page at the second scanning speed if the first speed is the monochromatic speed and the second page is determined to be color by the detection circuit, or if the first speed is the color speed and the second page is determined to be monochrome by the detection circuit.

15. The system according to claim 14, wherein the first scanning speed is the monochromatic speed and the second scanning speed is the color speed.

16. A system according to claim 13, wherein the light source scans a second page in the document at the first scanning speed if the first page is not rescanned, and scans the second page at the second scanning speed if the first page is rescanned.

17. A system according to claim 16, wherein the detection circuit is further configured to determine if the second page is color or monochrome based on a result of the scan of the second page, and
wherein the light source rescans the second page if the scanning speed for the second page is the monochromatic speed and the second page is determined to be color by the detection circuit, or if the scanning speed for the second page is the color speed and the second page is determined to be monochrome by the detection circuit.

18. A system according to claim 16, wherein, for each subsequent page of the document, the light source scans that subsequent page at the same scanning speed as the last scanning speed of the preceding page of the document.

19. A system for scanning a document comprising a plurality of pages, the system comprising:
a light source that scans light a first page in the document at a first scanning speed, the first scanning speed being one of a color speed and a monochromatic speed;
one or more mirrors that reflect the light scanned on the first page;
a 4-line CCD sensor having a monochromatic sensor, a red sensor, a green sensor, and a blue sensor, which detect the light reflected by the one or more mirrors and generate monochromatic data, red data, green data, and blue data, respectively, of the first page from the detected light;

a detection circuit configured to determine if the first page is color or monochrome based on the monochromatic data, red data, green data, and blue data of the first page; and a count circuit configured to maintain a count of the number of scanned pages that are color and the number of scanned pages that are monochrome, and at each subsequent page of the document to be scanned, wherein that subsequent page is initially scanned at the monochrome scanning speed or the color scanning speed when the majority of the scanned pages are monochrome or color, respectively, wherein only the monochromatic data from the monochromatic sensor is accepted if the detection circuit determines the first page to monochrome, and only at least two of the red data, green data, and blue data are accepted if the detection circuit determines the first page to be color.

* * * * *